(12) United States Patent
Bennett (10) Patent No.: US 6,513,313 B1
(45) Date of Patent: Feb. 4, 2003

(54) SUPPORT STRUCTURE FOR A DIVIDER OF AN AGRICULTURAL CORN HEAD

(75) Inventor: Kelvin E. Bennett, Geneseo, IL (US)

(73) Assignee: Case, LLC, Racine, WI (US)

( * ) Notice: Subject to any disclaimer, the term of this patent is extended or adjusted under 35 U.S.C. 154(b) by 0 days.

(21) Appl. No.: 09/658,402

(22) Filed: Sep. 8, 2000

(51) Int. Cl.⁷ .............................................. A01D 63/00
(52) U.S. Cl. .......................................... 56/319; 56/119
(58) Field of Search ........................... 56/51, 314, 319, 56/119, DIG. 24; 172/311

(56) References Cited

U.S. PATENT DOCUMENTS

| | | | | |
|---|---|---|---|---|
| 4,446,682 A | * | 5/1984 | Jennen et al. | 56/119 |
| 4,493,181 A | * | 1/1985 | Glendenning et al. | 56/314 |
| 4,700,537 A | * | 10/1987 | Emmert | 56/314 |
| 5,253,717 A | * | 10/1993 | Roush et al. | 172/311 |
| 6,247,297 B1 | * | 6/2001 | Becker | 56/119 |

\* cited by examiner

Primary Examiner—Thomas B. Will
Assistant Examiner—Meredith C. Petravick
(74) Attorney, Agent, or Firm—Rebecca L. Henkel (57) ABSTRACT

A support structure for a divider of an agricultural corn head that includes a first tension member that is pivotally attached to a second tension member. A stop is provided which prevents the lines of tension of the first and second tension members from aligning. The tension assembly can therefore buckle upwards when an object underneath the support structure is struck. A lateral support for the divider is also provided with a clearance opening for the tension assembly. The divider can be rotated rearward into a transport or a service position and securely locked in place. A shipping position is provided in which the support structure can be rotated rearward by disconnecting the tension assembly.

20 Claims, 5 Drawing Sheets

SUPPORT STRUCTURE FOR A DIVIDER OF AN AGRICULTURAL CORN HEAD

FIELD OF THE INVENTION

The present invention relates generally to agricultural combines. It relates particularly to a corn head.

BACKGROUND OF THE INVENTION

An agricultural combine is a common and well-known machine for harvesting crop materials. Agricultural combines are available in various designs and models to perform the basic functions of reaping crop materials from a crop field, separating the grain from the non-grain crop materials, and discarding the non-grain crop materials back onto the crop field.

A typical combine includes a crop harvesting apparatus, or header, which reaps ripened crop plants from the crop field. The header then feeds the crop materials rearwardly to a threshing system which separates the grain and fine non-grain materials from the coarse non-grain materials. The grain and fine non-grain materials are then directed to a series of moving sieves which further separate the grain from the fine non-grain materials with the aid of a cleaning fan. Finally, the grain is conveyed up to an onboard storage bin, while the coarse and fine non-grain materials are discharged from the rear end of the combine onto the harvested crop field.

One type of header that is used for reaping and gathering crop plants, which is well-known to those skilled in the art of combines, is a corn head. A corn head is a specially designed header that is used for stripping ripened corn ears from the plant stalks. The corn head then feeds the corn ears rearwardly to the combine, where the corn is separated from the cob and the husks. Typically, corn is planted in crop fields in a number of parallel rows which can range from fifteen inches to forty inches in width. The corn head, therefore, includes a number of individual row units that are spaced apart along the width of the corn head so that each row unit operates on a separate row of corn. Corn heads are available in a number of different widths, commonly ranging between four rows and twelve rows in width.

The row units perform the critical task of stripping the corn ears from the stalks. To accomplish this task, a narrow opening is provided that extends between two stripper plates approximately two to three feet in the direction of the corn rows. The narrow opening is wide enough to allow the corn stalks to travel freely through the length of the opening but is narrower than the diameter of the corn ears. Also provided is a set of stalk rolls which are installed under the narrow opening, with one stalk roll positioned on each side of the opening. Each of the stalk rolls includes a cylindrical body with spiral vanes that extend outward from the cylinder's surface. The stalk rolls then rotate around an approximately horizontal axis which is in a plane parallel to the corn rows and the narrow opening. Therefore, when the corn plants enter the front end of the narrow opening, the rotating spiral vanes of the stalk rollers grab the corn stalks and pull the stalks downward. As the corn stalks are pulled down through the narrow opening the wider corn ears are stripped from the stalk by the stripper plates. Gathering chains which include extended fingers then feed the stripped corn ears rearwards toward a gathering conveyor.

One problem with this method of stripping corn ears from the stalks is the inability of the combine operator to consistently maneuver the combine accurately enough to align the narrow opening to receive the rows of corn. This problem is typically solved with a funneling system that directs the corn plants to the narrow opening when the row unit and corn row are misaligned. Typically, this funneling system includes a divider that is made from sheet metal or plastic and which forms an elongated shield between adjacent row units. The divider, therefore, extends forward from the row units and travels between the rows of corn. The divider further includes a pointed forward end and an expanded rear end that spans between adjacent narrow openings. Thus, as the rows of corn plants contact the sides of the divider because of misalignments between the corn head and the corn rows, the corn plants are redirected towards the narrow opening in a funnel-like manner.

Typically, an adjustment mechanism is provided for adjusting the height of the divider to allow the divider to effectively funnel corn plants of various heights and conditions. For example, in some cases the corn is broken down by wind prior to harvest so that the crop stalks are lying near the ground. In this case the dividers can be adjusted downwards to allow recovery of the fallen crops. In extreme cases the divider is lowered all the way down near the ground surface so that the bottom of the divider skims the ground. In other cases when the corn is standing tall, the dividers can be raised several feet off the ground to minimize the portion of the corn stalks that must be fed through the stripper plates.

Several height adjustment mechanisms are known to the art. One known mechanism includes a tension shaft assembly that extends from the front end of the divider to a rearward support structure. This mechanism uses a series locking holes and a lock pin to vary the length of the shaft assembly, which correspondingly adjusts the height of the divider. This mechanism has the disadvantage, however, of providing only a limited number of height adjustments based on the number of holes provided and their spacing.

Another adjustment mechanism that is known to the art is a tension chain assembly with an L screw. In this assembly the chain includes a number of links and extends between the front end of the divider and a rearward support. The L screw is attached between one end of the chain and the front or rear connecting point. The length of the assembly, and consequently the height of the divider, is then adjusted in a two step process. Accordingly, the height is first roughly set by removing or adding links of the chain to the tension length. Next, the height can be fine tuned by adjusting the L screw inward or outwards. This adjusting process is time consuming, however, and can require repeated trials to arrive at the desired height. Another disadvantage of this mechanism is the existence of a loose flopping member that can become entangled with the fingers of the gathering chain. This situation can occur when the dividers are set close to the ground and a raised object is struck by the bottom of a divider. The divider will then buckle upwards around a rearward pivot connection which then releases the tension from the chain. Once this happens the loose chain can flop around and become entangled in the gathering chain. The entanglement such as this will damage the tension chain and the gathering chain and will require repairs before harvesting can proceed.

Another problem with dividers is the long length of the divider that extends past the front end of the row units. Typically, the dividers extend approximately three to four feet in front of the row units in order to effectively funnel the crop rows. This extended length, however, is a disadvantage when the combine is being transported from location to location or when the corn head is being shipped from the manufacturer. During farm transportation this extended length creates a collision hazard, which the combine operator must be attentive to. In addition, the manufacturer's shipping costs are increased because of the extended dividers. Typically, shipping costs are calculated based on the volume of the product being shipped. Manufacturers, therefore, regularly try to reduce these costs by minimizing unnecessary extending portions which require additional shipping volume.

BRIEF SUMMARY OF THE INVENTION

Accordingly, it is an object of the invention to provide a tension assembly for the support structure of a divider that can buckle upwards along a predetermined and predictable travel path when the divider strikes ground objects.

It is a further object of the invention to provide a clearance opening through a lateral hood support for the tension assembly.

It is still a further object of the invention to provide a height adjustment mechanism with infinite adjustments within a range.

It is still a further object of the invention to provide a retention pin along the front end of the support structure that can lock the front end of the divider in a rearward transport or service position.

It is still a further object of the invention to provide a shipping position for the support structure that minimizes the portion that extends beyond the front end of the row units.

The support structure includes a pivot support member attached to the corn head, with longitudinal support members pivotally attached to the pivot support member. A cross support member is attached to the forward end of the longitudinal support members. The tension assembly includes a first tension member and a second tension member which are pivotally attached to each other. The rear end of the first tension member is pivotally attached to the pivot support member, and the front end of the second tension member is pivotally attached to the cross member. The lateral hood support is installed across the top of the first tension member and includes a clearance opening to allow travel clearance for the first tension member. Additionally, the first tension member is bent downward to provide further travel clearance. A retention pin is included along the front end of the support structure which can lock the divider in a rearward position to allow a secure transport or service position.

BRIEF DESCRIPTION OF SEVERAL VIEWS OF THE DRAWINGS

The invention, including its construction and method of operation, is illustrated more or less diagrammatically in the drawings, in which.

DETAILED DESCRIPTION OF THE INVENTION

Figure 1:
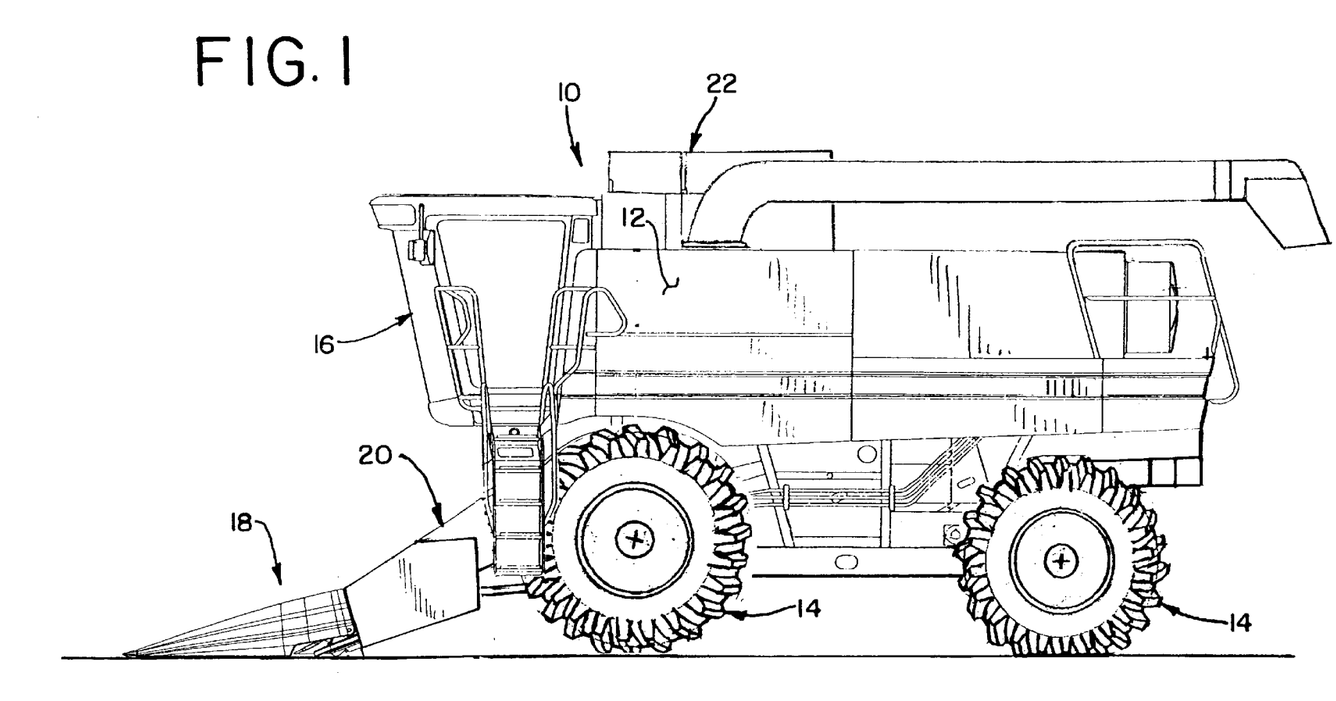
FIG. 1 is a side elevational view of an agricultural combine with a corn head attached to the front end.

Referring now to the drawings, and particularly to FIG. 1, there is shown a self-propelled agricultural combine 10. The combine 10 includes a body 12 supported by wheels 14 and an engine (not shown) for driving the wheels 14 to allow the combine 10 to move from place to place. An operator's station 16 is positioned towards the forward end of the combine body 12 and includes numerous controls to allow the operator to adjust the functions of the combine 10.

At the forward end of the combine is a corn harvesting head 18 for stripping ears of corn from the corn stalks. Corn heads 18 are well-known to those skilled in the art of agricultural combines 10 and only a brief explanation of its operation will be necessary.

Figure 2:
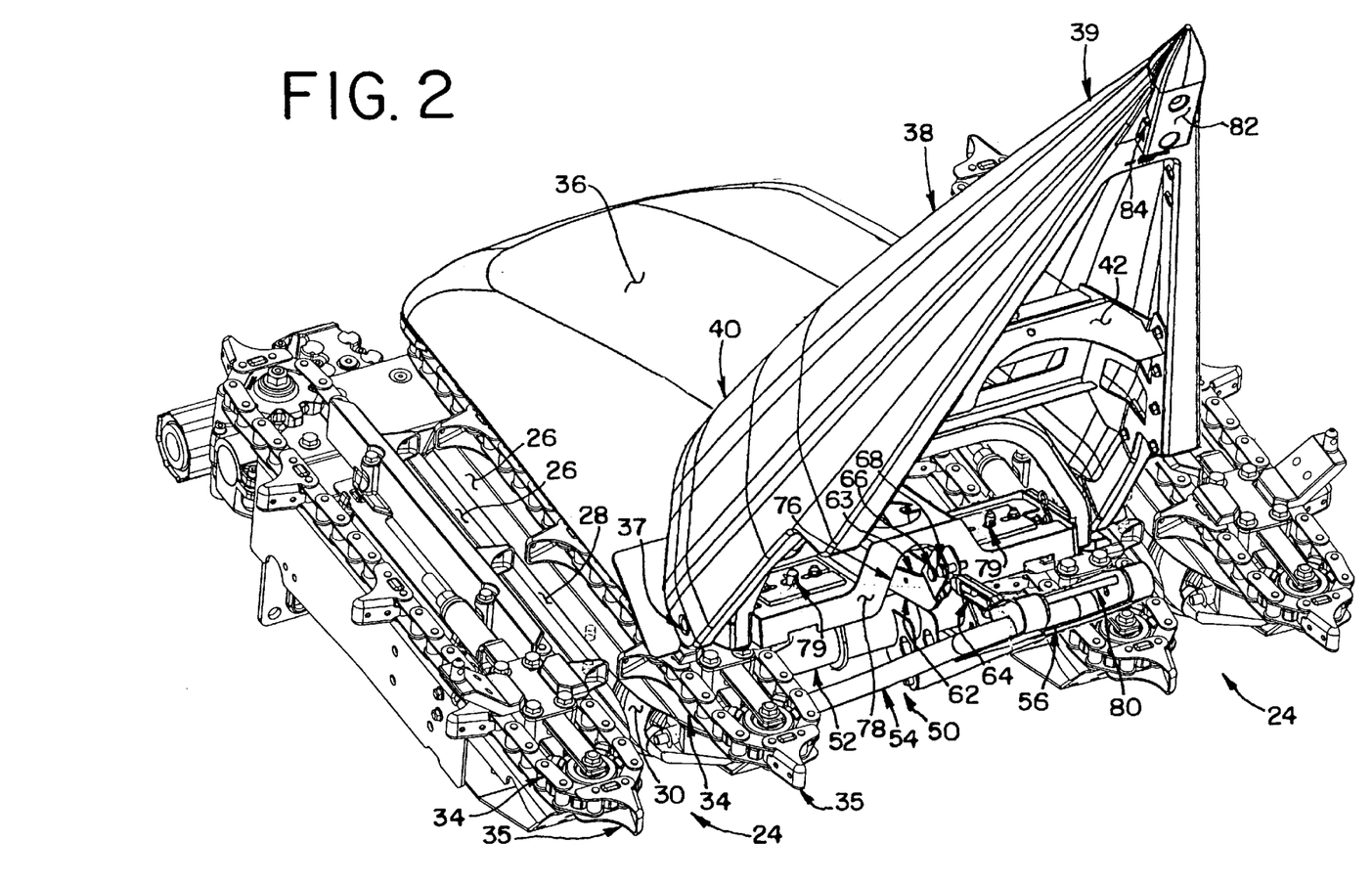
FIG. 2 is a perspective view of a portion of a corn head, showing two adjacent row units and a divider that is lifted up to illustrate a support structure.

Referring now to FIG. 2, the corn head 18 includes a number of row units 24 that are usually equally spaced along the width of the head 18. Each row unit 24 thus operates on a single row of corn as the combine 10 travels through the crop field. The row units 24 include a set of stripper plates 26 that are installed on each side of a narrow opening 28. The narrow opening 28 extends forward and has a front entrance opening which allows crop stalks to enter the narrow opening 28 as the combine 10 travels through the field. A corresponding set of stalk rolls 30 is installed under the stripper plates 26. Each of the stalk rolls 30 includes a cylindrical body (not shown) and a number of spiral vanes (not shown) attached to the exterior of the cylindrical body. The cylindrical body is then rotatably connected to the row unit 24 so that the axis of rotation is generally horizontal and parallel to the narrow opening 28.

Therefore, when a corn stalk enters the narrow opening 28, the spiral vanes of the stalk rolls 30 engage the stalk on each side of the row. The stalk rolls 30 are rotatably driven so that the stalks are pulled downward by the stalk rolls 30 through the narrow opening 28. The width of the narrow opening 28 is specially sized to allow the stalks to freely travel through the opening 28 but to prevent the corn ears from traveling through the opening 28. Thus, when the ears contact the stripper plates 26 as the corn stalk is being pulled downward, the ear is stripped from the stalk.

A set of gathering chains 34 then feed the stripped ears rearward. The gathering chains 34 include a number of extended fingers 35 that engage and push the loose ears rearward. Each gathering chain 34 is installed above one of the stripper plates 26. Thus, after the stripper plates 26 separate the ear from the stalk, the gathering chain fingers 35 from each side of the narrow opening 28 push the ears rearward along the top of the stripper plates 26 towards the gathering conveyor (not shown). The gathering conveyor is a large cylindrical rotating member that extends across the width of the corn head 18 and includes spiral vanes for engaging the corn ears. The gathering conveyor then feeds the ears to a feeder housing 20 which feeds the ears rearward into the combine body 12 where the grain is separated from the cobs and the husks. After separation, the grain is stored in an onboard storage bin 22 and the non-grain materials are discharged from the rear end of the combine.

A divider 38 is provided which travels between the rows of corn and funnels the rows of corn into the narrow opening 28 as the combine 10 travels through the field. The divider 38 is a sheet metal or plastic shield that extends forward from the row units 24 and has a narrow pointed front end 39 and a wider rear end 40 that extends between adjacent narrow openings 28. Along the rear end 40 of the divider 38, the divider 38 is pivotally attached at 37 to a hood 36. The hood 36 is a shield that extends from the rear end 40 of the divider 38 and along the top side of the row units 24. The hood 36, thus, protects the top side of the row units 24 from crop debris and directs the stripped corn ears down to the gathering chain fingers 35.

Referring now also to FIGS. 3 through 6, a support structure 50 is provided under the divider 38 for providing vertical and lateral support to the divider 38. Accordingly, the divider 38 rests upon the support structure 50 through an interior support cage 42. The support structure 50 is attached to the row units 24 with a pivot support member 52 that extends between two adjacent row units 24. Pivotally attached at 53 to the pivot support member 52 are two longitudinal support member 54 that extends forward beyond the row units 24. At the forward end of the longitudinal support members 54 is a cross support member 56 that is fixedly connected to the longitudinal support members 54. Preferably, the longitudinal support members 54 and the cross support member 56 are formed from a single U-shaped member. Finally, a tension assembly 60 is pivotally attached at A along its rear end to the pivot support member and is pivotally attached at B along its front end to the cross support 56.

The tension assembly 60 is a multiple piece assembly that includes a first member 62 and a second member 64. The rear end of the first member 62 is pivotally attached at A to the pivot support member 52, and the front end of the second member 64 is pivotally attached at B to the cross support 56. The front end of the first member 62 and the rear end of the second member 64 are then pivotally attached to each other through a pivot pin 66. A stop pin 68 is installed through the clevis 65 of the first member 62 and rests against the top side of the second member 64 when the support structure 50 is in its bottom, at rest position.

The tension assembly 60 performs several different functions. The tension assembly 60 resists gravity to support the longitudinal support members 54 in their bottom, at rest position. The tension assembly 60 also provides a height adjustment mechanism 70 for raising or lowering the position of the divider 38.

In the preferred embodiment, the height adjustment mechanism 70 is a turnbuckle 70. Turnbuckles 70 are well-known in the art and include oppositely threaded rods 71 that are screwed into opposing ends of the turnbuckle frame 72. Thus in the present invention, when the turnbuckle frame 72 is turned in one direction the second tension member 64 is shortened and is lengthened when the turnbuckle frame 72 is turned in the other direction. Correspondingly, the longitudinal support members 54 and the divider 38 raise and lower as the turnbuckle frame 72 is turned. A locking member 74 is threaded onto one of the rods 71 and can be tightened against the turnbuckle frame 72 in order to resist unwanted vibrational turning of the frame 72. The locking member 74 may take the form of a locknut or may be a specially shaped plate 74 that can be tightened without a wrench.

Figure 5:
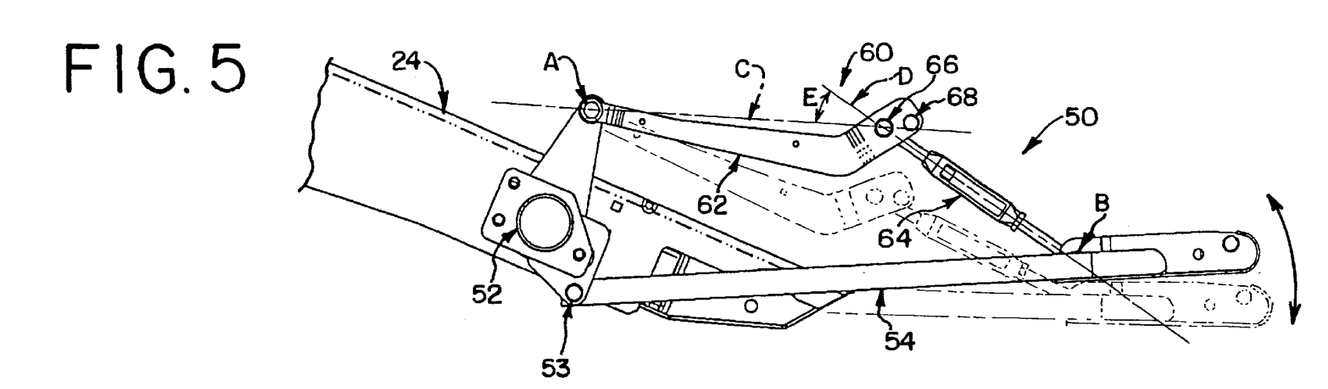
FIG. 5 is a side elevational view of the support structure, showing the support structure buckled upwards.

According to the invention, the tension assembly 60 buckles upward when an object from the ground is struck by the support structure 50. Often combine operators will lower the corn head 18 and adjust the dividers 38 downward with the turnbuckle 70 so that the support structure 50 travels near the ground surface. It is expected in this situation that raised objects from the ground will be frequently struck by the bottom side of the support structure 50. The construction of the tension assembly 60 allows the support structure 50 to raise up over the underlying objects. To achieve this end the stop pin 68 is positioned to prevent the lines of tension 50 of the first and second members 62, 64 from aligning with each other. Thus, an angle E of about 10° is formed between the line of tension C of the first member 62, which extends between its rear pivot connection A and the pivot pin 66, and the line of tension D of the second member 64, which extends between its front pivot connection B and the pivot pin 66. This angle E then allows the first and second members 62, 64 to rotate upwards through the pivot pin 66 and correspondingly raise the longitudinal support members 54 when an underlying object is struck.

The rigid first and second tension members 62, 64 also eliminate entanglement problems that occur with chain support systems. In these systems the divider 38 is also capable of buckling upwards when an underlying object is struck. However, the chain in these systems becomes loose during buckling and consequently can flop around and become entangled in nearby assemblies. In contrast, the tension members 62, 64 of the invention travel along predetermined and predictable paths during buckling, thus removing the risk of entanglement.

Figures 3, 6:
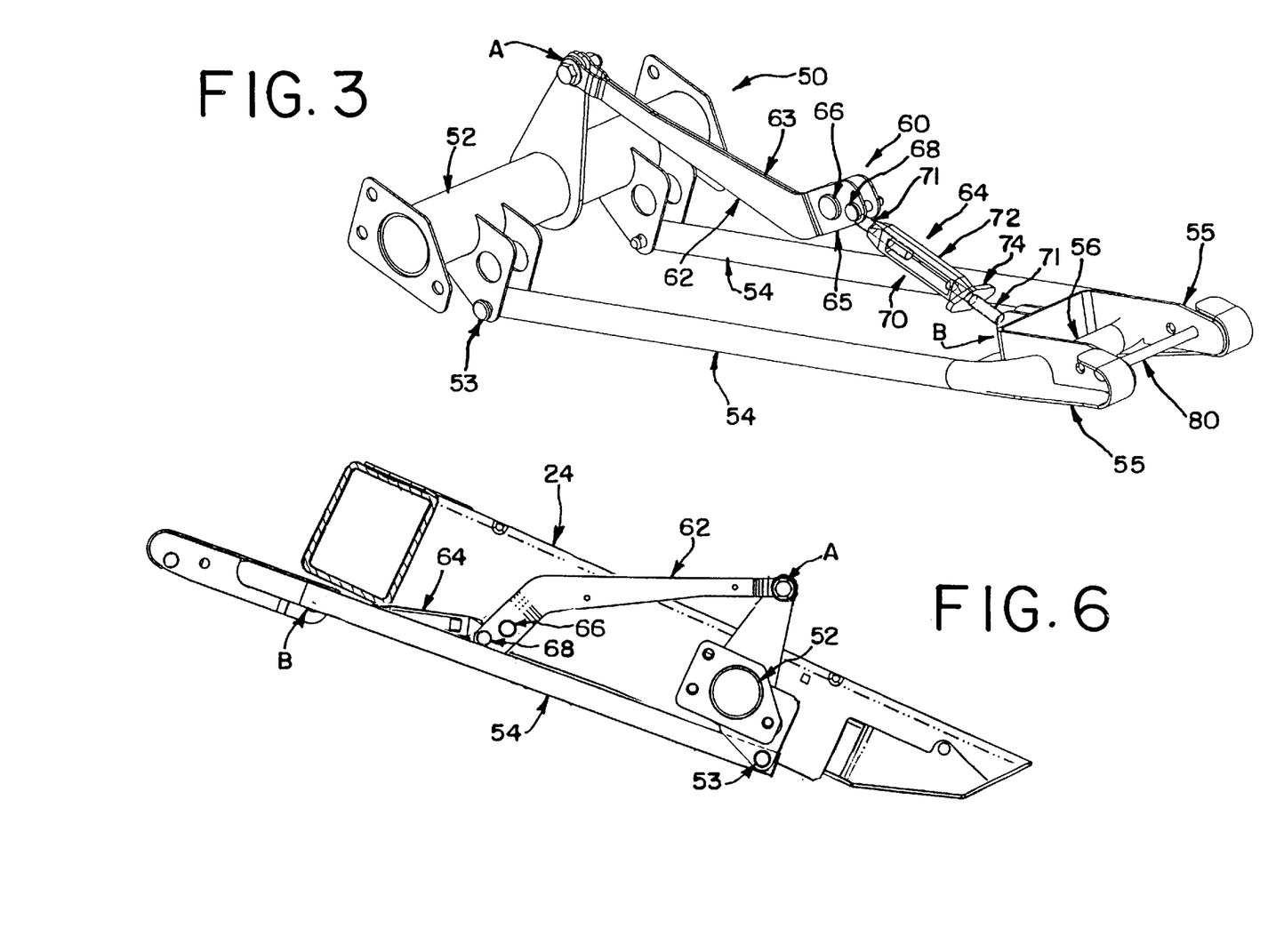
FIG. 3 is a perspective view of the support structure.
FIG. 6 is side elevational view of the support structure, showing the support structure rotated rearwards in a shipping position.
Figure 4:
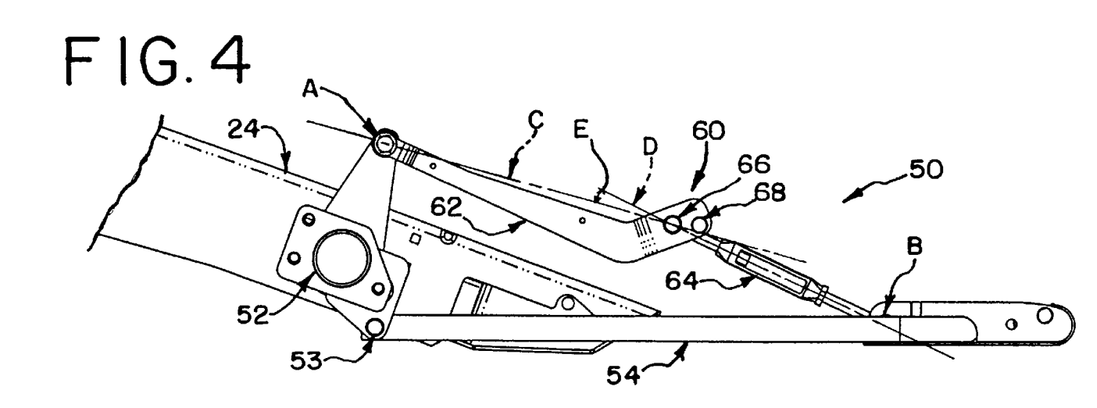
FIG. 4 is a side elevational view of the support structure, showing the support structure in its bottom at rest position.

The invention also provides a clearance opening 76 in the lateral hood support 78 to allow for free movement of the first tension member 62. The lateral hood support 78 typically extends between the width of the hood 36 to laterally support the width of hood 36. Attaching mechanisms 79 may also be provided to fixedly attach the hood support 78, and consequently the hood 36 and the divider 38, to the row units 24 during harvesting. In the present invention the rear connecting point A of the first tension member 62 is located behind the lateral hood support 78. Therefore, a clearance opening 76 of sufficient height is provided through the lateral hood support 78 to accommodate the expected upward movement of the first tension member 62. In addition to the clearance opening 76, the first tension member 62 has been shaped with a downward bend away from the line of tension C to also provide clearance. Thus in the preferred embodiment, 60 millimeters of clearance is provided between the lateral hood support 78 and the first tension member 62. Accordingly, the height of the clearance opening 76 is about 80 millimeters. The top surface 63 of the first tension member 62 is also bent downward about 12 millimeters from the line of tension C.

Figures 7, 8:
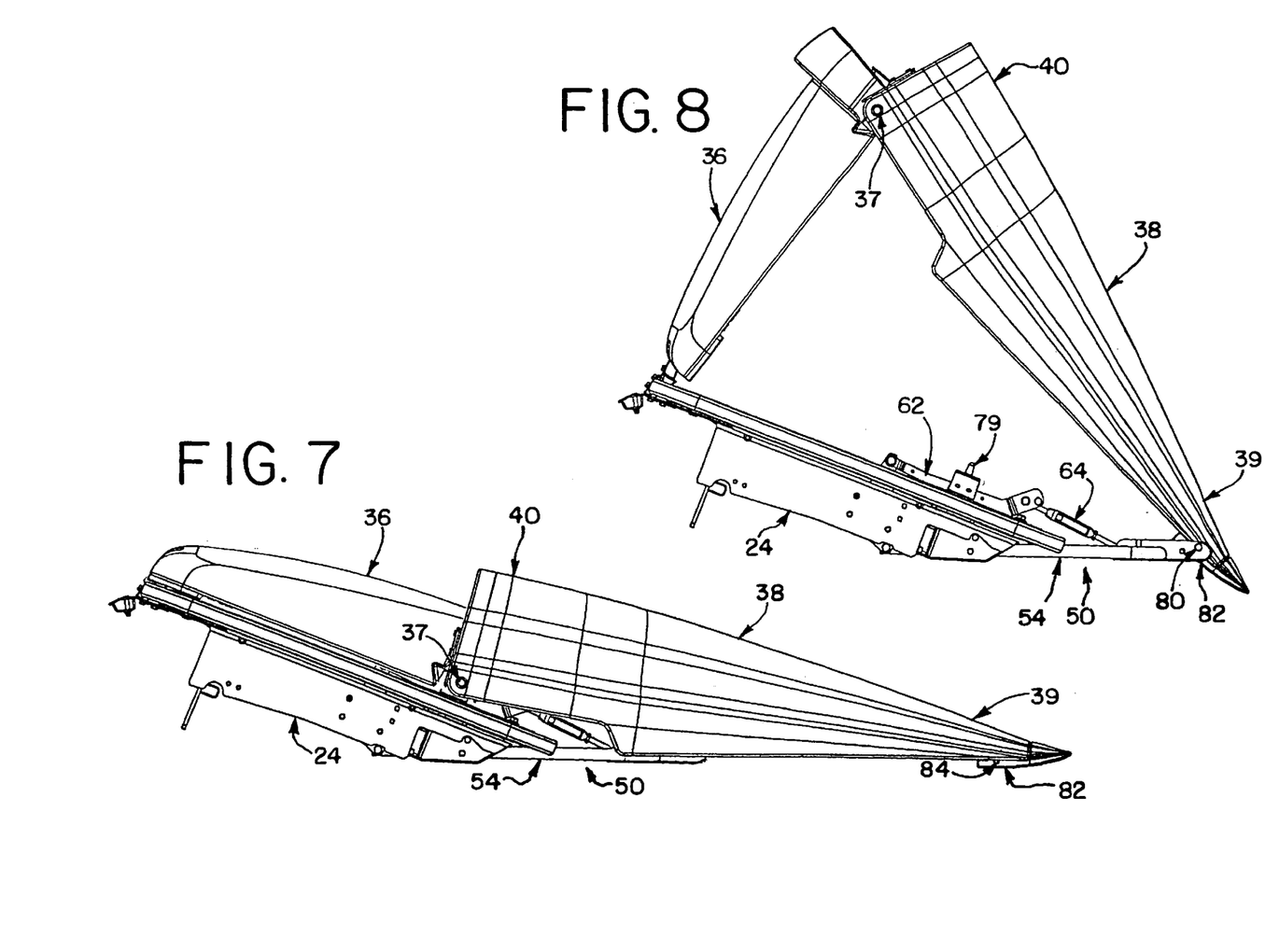
FIG. 7 is a side elevational view of a portion of a corn head, showing the divider and hood lowered in an operating position.
FIG. 8 is a side elevational view of a portion of a corn head, showing the divider and hood raised in a transport or service position.

Referring now to FIGS. 2, 7, and 8, a retention pin 80 is provided at the front end of the support structure 50 for shortening the extended length of the divider 38 and raising the hood 36 and the divider 38 from the row units 24. This feature is provided to minimize the collision hazard presented by the long, forward extending dividers 38 during transport. In addition, a secure service position of the hood 36 and the divider 38 is provided. Therefore, a receiver 82 is also provided at the forward end 39 of the divider 38. A retention hole 84 is provided through the receiver 82 for receiving the retention pin 80. Thus, by unlocking the attaching mechanisms 79 and raising the pivot connection 37 between the hood 36 and the divider 38, the front end 39 of the divider 38 can be relocated rearward and locked into place with the retention pin 80 and hole 84. The front end 39 of the divider 38 then rests between extended arms 55 that support the retention pin 80. The extended length of the divider 38 therefore is substantially reduced.

As is also readily apparent from these FIGURES, the row unit 24 can be easily accessed and serviced when the hood 36 and divider 38 are raised in this position. The retention pin 80 thus securely retains the hood 36 and the divider 38 in this raised position to prevent them from falling while a person is working underneath.

Referring now to FIG. 6, the support structure 50 can also be repositioned to provide a compact package during shipping of the corn head 18. In this application the divider 38 is disconnected from the support structure 50 and shipped unattached. The rear connecting point A of the first tension member 62 is then disconnected to allow the longitudinal support members 54 to freely rotate around their pivot connections 53. This allows the support structure 50 to be rotated around so that the support structure 50 is facing rearward instead of forward. Thus in this rearward shipping position, the support structure 50 no longer extends beyond the forward end of the row units 24. The tension assembly 60 can then be secured in place by either strapping the assembly 60 down with appropriate shipping materials, or preferably, the rear end of the first tension member 62 is reconnected to its connecting point A.

While a preferred embodiment of the invention has been described, it should be understood that the invention is not so limited, and modifications may be made without departing from the invention. The scope of the invention is defined by the appended claims, and all devices that come within the meaning of the claims, either literally or by equivalence, are intended to be embraced therein.

I claim:

1. A support structure for a divider of an agricultural combine head, comprising,
   a) a first member linked to the head;
   b) a second member;
   c) said first member and said second member being pivotally attached to each other; and
   d) a stop that is positioned to prevent the line of tension of said first member and the line of tension of said second member from aligning with each other.

2. A support structure for a divider of an agricultural combine head, comprising,
   a) a first member;
   b) a second member;
   c) said first member and said second member being pivotally attached to each other;
   d) a stop that is positioned to prevent the line of tension of said first member and the line of tension of said second member from aligning with each other;
   e) a pivot support member that is attached to said head;
   f) a longitudinal support member that is pivotally attached to said pivot support member;
   g) a cross support member that is attached to said longitudinal support member;
   h) said first member being pivotally attached to said pivot support member; and
   i) said second member being pivotally attached to said cross support member.

3. The support structure according to claim 2, wherein:
   a) said first member's line of tension extends between said pivotal attachment of said first member to said pivot support member and said pivotal attachment of said first member to said second member;
   b) said second member's line of tension extends between said pivotal attachment of said second member to said cross support member and said pivotal attachment of said second member to said first member; and
   c) an angle greater than 0° is formed between said first member line of tension and said second member line of tension when said stop is engaged.

4. The support structure according to claim 3, wherein said angle is about 10°.

5. A support structure for a divider of an agricultural combine head, comprising,
   a) a first member;
   b) a second member;
   c) said first member and said second member being pivotally attached to each other;
   d) a stop that is positioned to prevent the line of tension of said first member and the line of tension of said second member from aligning with each other;
   e) a transverse support for supporting the width of a crop shield; and
   f) a clearance opening through said transverse support that provides travel clearance for said first member or said second member.

6. The support structure according to claim 5, wherein:
   a) said transverse support is located above said first member; and
   b) said clearance opening is about 80 millimeters in height.

7. A support structure for a divider of an agricultural combine head, comprising,
   a) a first member;
   b) a second member;
   c) said first member and said second member being pivotally attached to each other;
   d) a stop that is positioned to prevent the line of tension of said first member and the line of tension of said second member from aligning with each other;
   wherein said first member has a bended shape to provide travel clearance between a transverse support and the first member.

8. The support structure according to claim 7, wherein said first member has a downward bended shape so that a top surface of the first member is about 12 millimeters below said first member line of tension.

9. A support structure for a divider of an agricultural combine head, comprising,
   a) a first member;
   b) a second member;
   c) said first member and said second member being pivotally attached to each other;
   d) a stop that is positioned to prevent the line of tension of said first member and the line of tension of said second member from aligning with each other;
   wherein said second member is a height adjustment mechanism with a screw that is capable of providing infinite adjustments along the entire distance between a maximum height and a minimum height.

10. The support structure according to claim 9, wherein said height adjustment mechanism is a turnbuckle.

11. The support structure according to claim 10, further comprising a locking member that can be tightened against said turnbuckle without using a wrench.

12. The support structure according to claim 2, wherein said support structure can be rotated rearward by disconnecting an end of said first member or said second member.

13. The support structure according to claim 12, wherein said support structure can be rotated into a shipping position by disconnecting said pivotal attachment of said first member to said pivot support member so that no portion of the support structure extends beyond a front end of a row unit.

14. The support structure according to claim 13, wherein said first member is reconnected to said pivotal attachment of said first member to said pivot support member when said support structure has been rotated into said shipping position.

15. A support structure for a divider of an agricultural combine head, comprising:
   a) a first member;
   b) a second member pivotally attached to said first member;
   c) a pivot support member that is attached to said head;
   d) a longitudinal support member that is pivotally attached to said pivot support member;
   e) a cross support member that is attached to said longitudinal support member;
   f) said first member being pivotally attached to said pivot support member;
   g) said second member being pivotally attached to said cross support member;
   h) a transverse support for supporting the width of said divider;
   i) a clearance opening through said transverse support that provides travel clearance for said first member; and
   j) said first member having a bended shape to provide travel clearance between said transverse support and the first member.

16. The support structure of claim 15, wherein:
   a) said second member is a height adjustment mechanism with a screw that is capable of providing infinite adjustments along the entire distance between a maximum height and a minimum height;
   b) said support structure can be rotated rearward into a shipping position by disconnecting an end of said first member;
   c) a first locking member is located along a front end of said support structure;
   d) a second locking member is located along a front end of said divider; and
   e) said divider can be rotated rearward from an operating position to a transport or a service position so that a rear end of said divider is raised up in said transport or said service position.

17. A support structure for a divider of an agricultural combine head, comprising:
   a) a first locking member located along a front end of said support structure;
   b) a second locking member located along a front end of said divider;
   c) said front end of said divider being located forward of said front end of said support structure when said divider is in a first position and said first locking member an said second locking member are unconnected; and
   d) said front end of said divider being located rearward of said first position when said divider is in a second position and said first locking member and said second locking member are connected;
   wherein the structure is to be moved generally along a transport direction corresponding to the front end of the divider and, wherein:
      a) said first locking member is a retention pin; and
      b) said second locking member forms an essentially horizontal retention hole for receiving the retention pin, the retention hole formed so as to be essentially perpendicular to the travel direction.

18. The support structure according to claim 17, wherein said front end of said support structure includes extended arms for said first locking member that extend along the outer sides of said front end of said divider when said divider is in said second position.

19. The support structure according to claim 17, wherein:
   a) said first position is an operating position;
   b) said second position is a transport or a service position; and
   c) said divider can be rotated from said operating position to said transport or said service position so that a rear end of said divider is raised up in said transport or said service position.

20. The support structure according to claim 19, wherein said rear end of said divider is pivotally attached to a hood so that a front end of said hood is raised up in said transport or said service position.

* * * * *